(12) United States Patent
Kraus et al.

(10) Patent No.: US 6,283,629 B1
(45) Date of Patent: *Sep. 4, 2001

(54) METHOD OF CALIBRATING A RADIATION THERMOMETER

(75) Inventors: Bernhard Kraus, Braunfels; Frank Beerwerth, Runkel-Ennerich; Klaus Heubach, Bad Camberg; Manfred Kaiser, Karben, all of (DE)

(73) Assignee: Braun GmbH, Kronberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/542,214

(22) Filed: Apr. 4, 2000

Related U.S. Application Data

(62) Division of application No. 08/976,354, filed on Nov. 21, 1997, now Pat. No. 6,065,866, which is a continuation of application No. PCT/EP97/01531, filed on Mar. 26, 1997.

(30) Foreign Application Priority Data

Apr. 2, 1996 (DE) .............................................. 196 13 229

(51) Int. Cl.⁷ .................................................. G01K 15/00
(52) U.S. Cl. .............................. 374/2; 374/129; 374/133; 250/252.1
(58) Field of Search ................................... 374/2, 1, 133; 250/252.1

(56) References Cited

U.S. PATENT DOCUMENTS

| | | | |
|---|---|---|---|
| Re. 34,789 | * 11/1994 | Fraden | ................................. 374/133 |
| 3,318,133 | 5/1967 | Hahn . | |
| 4,464,725 | 8/1984 | Briefer . | |
| 4,634,294 | 1/1987 | Christol . | |
| 4,784,149 | 11/1988 | Berman et al. . | |
| 4,790,324 | * 12/1988 | O'Hara et al. | ........................... 374/2 |
| 4,993,419 | 2/1991 | Pompei et al. . | |
| 5,001,657 | * 3/1991 | Yagura et al. | ............................. 374/2 |
| 5,024,533 | * 6/1991 | Egawa et al. | ........................ 374/133 |
| 5,150,969 | 9/1992 | Goldberg et al. . | |
| 5,293,877 | * 3/1994 | O'Hara et al. | ........................ 374/133 |
| 5,333,784 | 8/1994 | Pompei . | |
| 5,967,992 | * 10/1999 | Canfield | ................................. 600/474 |
| 6,065,866 | * 5/2000 | Kraus et al. | .............................. 374/2 |

FOREIGN PATENT DOCUMENTS

| | | |
|---|---|---|
| 44 12 973 | 11/1994 | (DE) . |
| 0 446 788 | 9/1991 | (EP) . |
| 62-291526 | 12/1987 | (JP) . |
| 93/03666 | 3/1993 | (WO) . |

* cited by examiner

Primary Examiner—Diego Gutierrez
Assistant Examiner—Stanley J. Pruchnic, Jr.
(74) Attorney, Agent, or Firm—Fish & Richardson P.C.

(57) ABSTRACT

A method of calibrating a radiation thermometer including a radiation sensor that is characterized by a sensitivity (S) and a temperature-responsive resistor that serves as an ambient temperature sensor, the temperature-responsive resistor having at a specified reference temperature a reference resistance ($R_0$). The method includes the steps of using a first radiation standard having a known temperature $T_S(1)$; while the ambient temperature sensor is at a first ambient temperature $T_U(1)$, using the radiation thermometer to read the temperature of the first radiation standard; while using the radiation thermometer to read the temperature of the first radiation standard, measuring a first output signal $U(1)$ of the radiation sensor; using a second radiation standard having a known temperature $T_S(2)$; while the ambient temperature sensor is at said first ambient temperature $T_U(1)$, using the radiation thermometer to read the temperature of the second radiation standard; while using the radiation thermometer to read the temperature of the second radiation standard, measuring a second output signal $U(2)$ of the radiation sensor; and calibrating the radiation sensor and the ambient temperature sensor by using $T_S(1)$, $T_S(2)$ and the values obtained for $U(1)$ and $U(2)$ and without using any value for $T_U(1)$ that is derived from measuring an output of the ambient sensor, wherein the step of calibrating involves calculating at least one of the reference resistance ($R_0$) of the ambient temperature sensor, the ambient temperature ($T_u$), and the sensitivity (S) of the radiation sensor.

16 Claims, 1 Drawing Sheet

METHOD OF CALIBRATING A RADIATION THERMOMETER

Figure 1:
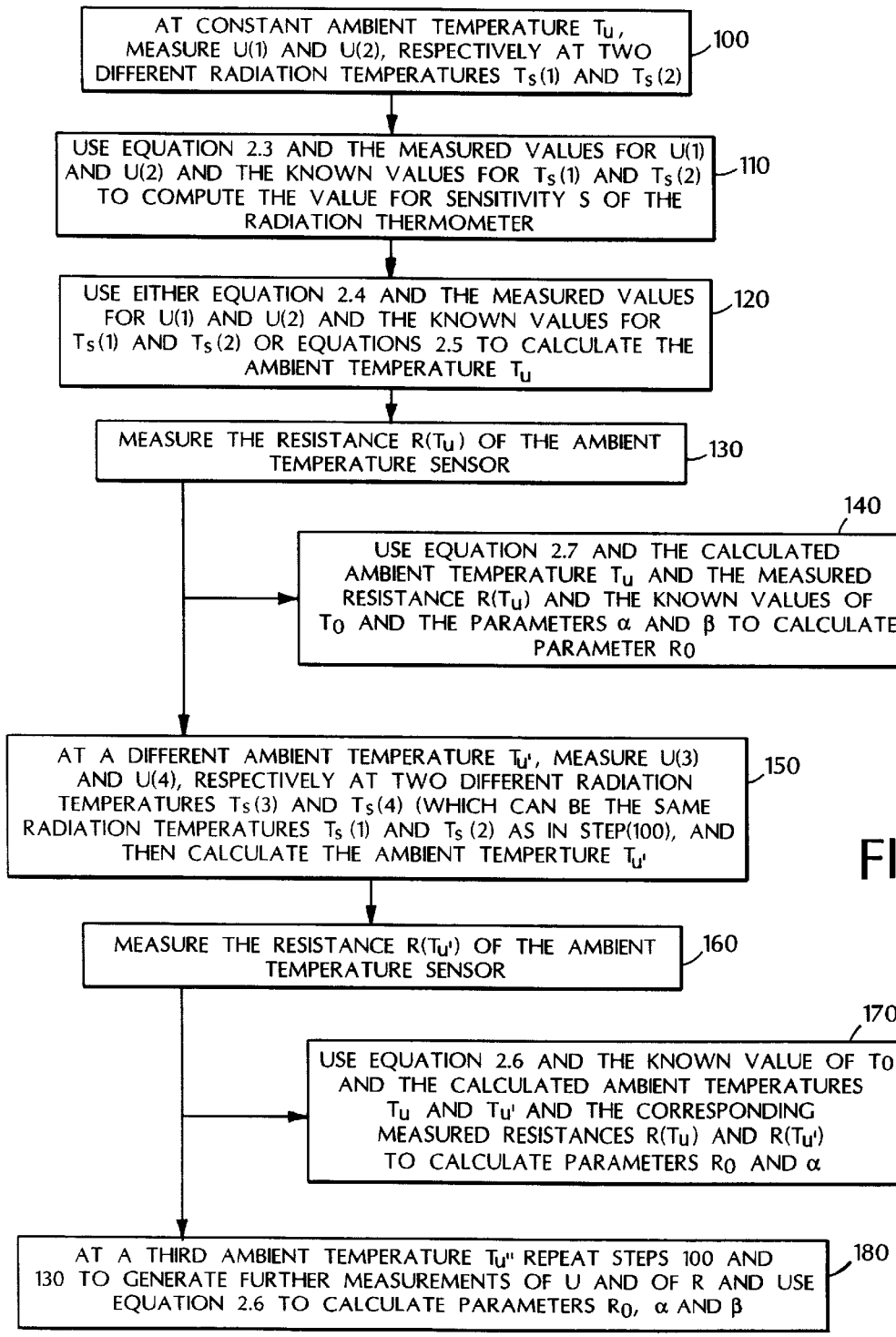

This is a divisional of application Ser. No. 08/976,354, filed on Nov. 21, 1997, now U.S. Pat. No. 6,065,866, which is a continuation of Application No. PCT/EP97/01531, filed Mar. 26, 1997.

This invention relates to a method of calibrating a radiation thermometer, which comprises a radiation sensor and an ambient temperature sensor, by means of a radiation standard with known temperature.

By means of a radiation sensor, the temperature differential between an object of measurement and a reference object-for example, a shutter or the radiation sensor itself-can be determined. In order to determine the absolute temperature of the object of measurement, additional knowledge is required of the temperature of the reference object. This temperature is conveniently determined by means of a temperature sensor thermally connected to the reference object in the best possible manner.

In the calibration of a radiation thermometer which incorporates a radiation sensor and an ambient temperature sensor, it is thus necessary to calibrate both sensors. In prior-art calibration methods, the output signals of the two sensors are determined at different radiation and ambient or reference temperatures. From these signals, the corresponding calibration parameters can then be established. To calibrate the ambient temperature sensor, the ambient temperature (possibly also several ambient temperatures) is (are) determined by means of an external, calibrated thermometer. The temperature of the external thermometer has to come as close as possible to the temperature of the sensor to be calibrated (for example, by immersing the sensor and the thermometer in the same liquid or by a prolonged adaptation period). The calibration of the ambient temperature sensor is thus conducted independently of the calibration of the radiation sensor.

Applicant knows from the field of control engineering that the time response of a system is described with reference to specified system quantities as well as parameters which ultimately describe the time response of the total system. To determine these parameters, it is known in the art to detect the system quantities variable with time and, using the detected quantities, to solve the system of equations for the parameters. On the basis of the parameters thus established, it is thus possible to describe the system's time response for the future. This method has become known in the art under the term referred to as process parameter identification. This method involves an overdetermination of the system of equations, that is, more pairs of measuring quantities are detected than are actually required, so that, for example, six equations are available for four quantities to be determined. The parameters to be established are determined by means of these six equations such that, for example, the square errors are minimized. This enables inaccuracies in the measurement of individual system quantities to be compensated for.

It is an object of the present invention to indicate a method which enables the calibration of a radiation thermometer to be performed in simple manner, said radiation thermometer including a radiation sensor and an ambient temperature sensor.

FIG. 1 shows the steps of calibrating a radiation thermometer in accordance with the invention.

The essential feature of the method of the present invention is the fact that, for calibration, it is necessary to know the temperature of a radiation standard, but not the ambient temperatures. Where necessary, however, the ambient temperatures can be determined from the output signals of the radiation sensor during calibration. Therefore, the method of the present invention is also especially suitable for the calibration of thermometers having a radiation sensor with built-in ambient temperature sensor, in which hence the ambient temperature sensor is not accessible from outside. It is, however, also in the calibration of other sensors that the accurate determination of the respective ambient temperatures is a relatively complex procedure. With the method herein described, time and measuring effort spent on calibration are significantly reduced, specifically for the series production of high-precision radiation thermometers intended for measuring not extremely high temperatures (for example, clinical radiation thermometers).

It shows to advantage that by using more than two radiation temperatures potential errors in the measurement of the radiation temperature and the detection of the sensor output signals can be compensated for in the calibration of the radiation thermometer.

The basic principle of the method of the present invention will be described in the following.

Generally, the radiation temperature $T_s$ to be measured by a radiation thermometer is expressable as a function f of the ambient temperature $T_u$, of the radiation sensor signal U, and of n calibration parameters $k_1, k_2, \ldots, k_n$ $$T_s = f(T_u, U, k_1, k_2, \ldots, k_n)$$

The ambient temperature $T_u$ is determined in the radiation thermometer from the output signal R of the corresponding temperature sensor and the function g. For this purpose, m further calibration parameters $c_1, c_2, \ldots, c_m$ must be generally known:

$$T_u = g(R, c_1, c_2, \ldots, c_m)$$

For calibrating a radiation thermometer, it is thus necessary to determine the p=n+m parameters $k_1, k_2, \ldots, k_n, c_1, c_2, \ldots, c_m$. To this end, with an appropriate variation of the ambient and radiation temperature, the output signal of the radiation sensor and the output signal of the ambient temperature sensor are determined p times. From this results a (nonlinear) system of equations with p equations and p unknowns:

$$T_s = f(g(R, c_1, c_2, \ldots, c_m), U, k_1, k_2, \ldots, k_n)$$

By (numerically) solving this system of equations, the m+n parameters $k_1, k_2, \ldots, k_n, c_1, c_2, \ldots, c_m$ are obtained. The ambient temperature $T_U$ can also be determined therefrom. If more than p measuring quantities are detected, an adjustment of errors can be made.

In the following, reference is made, by way of example, to a radiation thermometer which includes a thermopile radiation sensor and a silicon resistor. The silicon resistor serves to measure the ambient temperature which in the present example is identical with the reference temperature. For calibration, in this example the following relation is utilized between the radiation temperature $T_s$, the output signal U of the radiation sensor and the ambient temperature $T_U$:

$$T_S = \left(\frac{U}{S} + T_U^4\right)^{1/4}$$

where S denotes the sensitivity of the radiation thermometer which depends, among other things, on the radiation sensor used and the optical system of the radiation thermometer. Referring to FIG. 1, this parameter is determined in the calibration by measuring at two different radiation temperatures $T_s(1)$ and $T_s(2)$ (but at a constant ambient temperature $T_u=T_u(1)=T_u(2)$) the output voltages U(1) and U(2) of the radiation sensor (step 100). By transforming (2.1), the following system of equations is obtained:

$$T_S(1)^4 = \frac{U(1)}{S} + T_U^4$$

$$(T_S(2))^4 = \frac{U(2)}{S} + T_U^4$$

Subtracting the first from the second equation and subsequently solving for S yields directly the sensitivity S (step 110):

$$S = \frac{U(2) - U(1)}{(T_S(2))^4 - (T_S(1))^4}$$

Further, using the equation (2.3) in the two equations (2.2) also enables the ambient temperature $T_U$ to be obtained (step 120):

$$\left(T_U\left(\frac{1}{U(2)-U(1)}[U(2)(T_S(1))^4 - U(1)(T_S(2))^4]\right)\right)^{1/4}$$

or $$T_U = \left((T_S(1))^4 - \frac{U(1)}{S}\right)^{1/4} = \left((T_S(2))^4 - \frac{U(2)}{S}\right)^{1/4}$$

The resistance R of the ambient temperature sensor is expressable as follows:

$$R=R_0[1+\alpha(T_u-T_0)+\beta(T_u-T_0)^2] \quad (2.6)$$

where $T_0$ denotes a reference temperature (25° C.) at which the resistor has the value $R_0$. Typical values for the parameters are, for example, $R_0=1000\ \Omega$, $\alpha=7.8\cdot10^{-3}K^{-1}$ and $\beta=1.9\cdot10^{-5}K^{-2}$. The parameters $R_0$, $\alpha$ and $\beta$ are conventionally indicated by the sensor manufacturer, however, with certain tolerances. By measuring the resistance R (step 130) of the ambient temperature sensor at the above-determined ambient temperature $T_u$, the reference resistance $R_0$ can be determined in the calibration individually by solving the equation (2.6) for $R_0$ (step 140):

$$R_0 = \frac{R}{1+\alpha(T_U - T_0) + (\beta(T_U - T_0))^2}$$

Note: These simple relations apply only if the ambient temperature is the same in the two measurements. If this is not the case, a nonlinear system of equations results which may have to be solved numerically.

If the tolerances indicated by the manufacturer for the parameters $\alpha$ and $\beta$ are too wide to achieve the requisite accuracy, these parameters can also be determined individually. For this purpose, at another constant ambient temperature $T_U'=T_U'(1)=T_U'(2)$, the output voltages U(1)' and U(2)' of the radiation sensor (step 150) and the resistance R(2) of the ambient temperature sensor (step 170) are measured and, by analogy with the foregoing, the other ambient temperature $T_u'$ is determined from the equation (2.4) or (2.5) (step 160), and the parameter $\alpha$ is determined by solving the equation (2.6) for $\alpha$. In cases where it is desired to determine also the parameter $\beta$ individually, the calibration process is repeated at a third constant ambient temperature $T_U''$, (step 140).

By analogy and where necessary, further calibration parameters can be determined as, for example, the temperature coefficient of the sensitivity of the radiation sensor.

Also, in lieu of the equation (2.1), equations may be used for calibration which are adapted to the radiation characteristic of the measurement objects whose temperatures are to be measured with the radiation thermometer.

The above-identified method can be programmed on a microcontroller, for example. The parameters can then be determined by the microcontroller. The microcontroller can be an external device, storing the determined parameters in a suitable device of the radiation thermometer. Equally, it is also possible to utilize the microcontroller installed in a radiation thermometer for the determination of the parameters.

What is claimed is:

1. A method of calibrating a radiation thermometer including a radiation sensor that is characterized by a sensitivity (S) and an ambient temperature sensor, said method comprising:

using a first radiation standard having a known temperature $T_S(1)$;

while the ambient temperature sensor is at a first ambient temperature $T_U$, using the radiation thermometer to read the temperature of the first radiation standard;

while using the radiation thermometer to read the temperature of the first radiation standard, measuring a first output signal U(1) of the radiation sensor;

using a second radiation standard having a known temperature $T_S(2)$;

while the ambient temperature sensor is at said first ambient temperature $T_U$, using the radiation thermometer to read the temperature of the second radiation standard;

while using the radiation thermometer to read the temperature of the second radiation standard, measuring a second output signal U(2) of the radiation sensor; and calibrating the radiation sensor and the ambient temperature sensor by using $T_S(1)$, $T_S(2)$ and the values obtained for U(1) and U(2) and without using any value for $T_U$ that is derived from measuring an output of the ambient temperature sensor, wherein said step of calibrating involves calculating at least one of the first ambient temperature $T_U$, and the sensitivity (S) of the radiation sensor.

2. The method of claim 1 wherein the ambient temperature sensor is a temperature-responsive resistor having at a specified reference temperature a reference resistance $R_0$, said method further comprising measuring the resistance $R(T_u)$ of the ambient temperature sensor at said first ambient temperature $T_U$ and calculating the reference resistance $R_0$ of the ambient temperature sensor by using the calculated first ambient temperature $T_U$.

3. A method of calibrating a radiation thermometer including a radiation sensor and a temperature-responsive resistor that serves as an ambient temperature sensor, wherein the temperature-responsive resistor has at a specified temperature a reference resistance $R_0$ and a temperature dependence that is characterized by a linear temperature coefficient, said method comprising:

using a first radiation standard having a known temperature $T_S(1)$;

while the ambient temperature sensor is at a first ambient temperature $T_U$, using the radiation thermometer to read the temperature of the first radiation standard;

while using the radiation thermometer to read the temperature of the first radiation standard, measuring a first output signal $U(1)$ of the radiation sensor;

using a second radiation standard having a known temperature $T_S(2)$;

while the ambient temperature sensor is at said first ambient temperature $T_U$, using the radiation thermometer to read the temperature of the second radiation standard;

while using the radiation thermometer to read the temperature of the second radiation standard, measuring a second output signal $U(2)$ of the radiation sensor;

measuring a resistance $R(T_U)$ of the ambient temperature sensor at said first ambient temperature $T_U$;

using a third radiation standard having a known temperature $T_S(3)$;

while the ambient temperature sensor is at a second ambient temperature $T_U'$, using the radiation thermometer to read the temperature of the third radiation standard;

while using the radiation thermometer to read the temperature of the third radiation standard, measuring a third output signal $U(3)$ of the radiation sensor;

using a fourth radiation standard having a known temperature $T_S(4)$;

while the ambient temperature sensor is at said second ambient temperature $T_U'$, using the radiation thermometer to read the temperature of the fourth radiation standard;

while using the radiation thermometer to read the temperature of the fourth radiation standard, measuring a fourth output signal $U(4)$ of the radiation sensor;

measuring a resistance $R(T_U')$ of the ambient temperature sensor at said second ambient temperature $T_U'$; and calibrating the ambient temperature sensor by using $T_S(1)$, $T_S(2)$, $T_S(3)$ and $T_S(4)$ and the values obtained for $U(1)$, $U(2)$, $U(3)$ and $U(4)$ and without using any values for $T_U$ and $T_U'$ that are derived from measuring an output of the ambient temperature sensor, and wherein the step of calibrating involves calculating the first and second ambient temperatures $T_U$ and $T_U'$ and calculating the reference resistance $R_0$ and the linear temperature coefficient of the temperature-responsive resistor by using the calculated first and second ambient temperatures $T_U$ and $T_U'$.

4. The method of claim 3, wherein the radiation sensor is characterized by a sensitivity (S), and wherein the step of calibrating involves calculating the sensitivity (S) of the radiation sensor by using one of a first group of values and a second group of values, said first group consisting of $T_S(1)$, $T_S(2)$, $U(1)$, and $U(2)$ and said second group consisting of $T_S(3)$, $T_S(4)$, $U(3)$, and $U(4)$.

5. The method of claims 3 or 4 further comprising using the first radiation standard as the third radiation standard so that $T_S(3)=T_S(1)$ and using the second radiation standard as the fourth radiation standard so that $T_S(4)=T_S(2)$.

6. A method of calibrating a radiation thermometer including a radiation sensor and a temperature-responsive resistor that serves as an ambient temperature sensor, wherein the temperature-responsive resistor has at a specified reference temperature a reference resistance $R_0$ and a temperature dependence that is characterized by a linear temperature coefficient and a quadratic temperature coefficient, said method comprising:

using a first radiation standard having a known temperature $T_S(1)$;

while the ambient temperature sensor is at a first ambient temperature $T_U$, using the radiation thermometer to read the temperature of the first radiation standard;

while using the radiation thermometer to read the temperature of the first radiation standard, measuring a first output signal $U(1)$ of the radiation sensor;

using a second radiation standard having a known temperature $T_S(2)$;

while the ambient temperature sensor is at said first ambient temperature $T_U$, using the radiation thermometer to read the temperature of the second radiation standard;

while using the radiation thermometer to read the temperature of the second radiation standard, measuring a second output signal $U(2)$ of the radiation sensor;

measuring a resistance $R(T_U)$ of the ambient temperature sensor at said first ambient temperature $T_U$;

using a third radiation standard having a known temperature $T_S(3)$;

while the ambient temperature sensor is at a second ambient temperature $T_U'$, using the radiation thermometer to read the temperature of the third radiation standard;

while using the radiation thermometer to read the temperature of the third radiation standard, measuring a third output signal $U(3)$ of the radiation sensor;

using a fourth radiation standard having a known temperature $T_S(4)$;

while the ambient temperature sensor is at said second ambient temperature $T_U'$, using the radiation thermometer to read the temperature of the fourth radiation standard; and while using the radiation thermometer to read the temperature of the fourth radiation standard, measuring a fourth output signal $U(4)$ of the radiation sensor;

measuring a resistance $R(T_U')$ of the ambient temperature sensor at said second ambient temperature $T_U'$;

using a fifth radiation standard having a known temperature $T_S(5)$;

while the ambient temperature sensor is at a third ambient temperature $T_U''$, using the radiation thermometer to read the temperature of the fifth radiation standard;

while using the radiation thermometer to read the temperature of the fifth radiation standard, measuring a fifth output signal $U(5)$ of the radiation sensor;

using a sixth radiation standard having a known temperature $T_S(6)$;

while the ambient temperature sensor is at said third ambient temperature $T_U''$, using the radiation thermometer to read the temperature of the sixth radiation standard;

while using the radiation thermometer to read the temperature of the sixth radiation standard, measuring a sixth output signal $U(6)$ of the radiation sensor;

measuring a resistance $R(T_U'')$ of the ambient temperature sensor at said third ambient temperature $T_U''$; and calibrating the ambient temperature sensor by using $T_S(1)$, $T_S(2)$, $T_S(3)$, $T_S(4)$, $T_S(5)$ and $T_S(6)$ and the values obtained for U(1), U(2), U(3), U(4), U(5) and U(6) and without using any values for $T_U$, $T_U'$, and $T_U''$ that are derived from measuring an output of the ambient temperature sensor and wherein the step of calibrating involves calculating the first, second and third ambient temperatures, and calculating the reference resistance $R_0$ and the linear temperature coefficient and the quadratic temperature coefficient of the temperature-responsive resistor by using the calculated first, second and third ambient temperatures $T_U$, $T_U'$, and $T_U''$.

7. The method of claim 6, wherein the radiation sensor is characterized by a sensitivity (S), and wherein the step of calibrating involves calculating the sensitivity (S) of the radiation sensor by using one of first group of values, a second group of values, and a third group of values, said first group consisting of $T_S(1)$, $T_S(2)$, U(1), U(2), said second group consisting of $T_S(3)$, $T_S(4)$, U(3), and U(4), and said third group consisting of $T_S(5)$, $T_S(6)$, U(5), and U(6).

8. The method of claim 6 or 7 further comprising using the first radiation standard as the third radiation standard so that $T_S(3)=T_S(1)$ and using the second radiation standard as the fourth radiation standard so that $T_S(4)=T_S(2)$.

9. The method of claim 6 or 7 further comprising using the first radiation standard as the fifth radiation standard so that $T_S(5)=T_S(1)$ and using the second radiation standard as the sixth radiation standard so that $T_S(6)=T_S(2)$.

10. A method of calibrating a radiation thermometer including a radiation sensor and an ambient temperature sensor, wherein the ambient temperature sensor outputs at a specified reference temperature a reference output value $R_0$ and has a temperature dependence that is characterized by a linear temperature coefficient, said method comprising:

using a first radiation standard having a known temperature $T_S(1)$;

while the ambient temperature sensor is at a first ambient temperature $T_U$, using the radiation thermometer to read the temperature of the first radiation standard; while using the radiation thermometer to read the temperature of the first radiation standard, measuring a first output signal U(1) of the radiation sensor; using a second radiation standard having a known temperature $T_S(2)$;

while the ambient temperature sensor is at said first ambient temperature $T_U$, using the radiation thermometer to read the temperature of the second radiation standard; while using the radiation thermometer to read the temperature of the second radiation standard, measuring a second output signal U(2) of the radiation sensor;

measuring the output value $R(T_U)$ of the ambient temperature sensor at said first ambient temperature $T_U$;

using a third radiation standard having a known temperature $T_S(3)$;

while the ambient temperature sensor is at a second ambient temperature $T_U'$, using the radiation thermometer to read the temperature of the third radiation standard; while using the radiation thermometer to read the temperature of the third radiation standard, measuring a third output signal U(3) of the radiation sensor;

using a fourth radiation standard having a known temperature $T_S(4)$;

while the ambient temperature sensor is at said second ambient temperature $T_U'$, using the radiation thermometer to read the temperature of the fourth radiation standard; while using the radiation thermometer to read the temperature of the fourth radiation standard, measuring a fourth output signal U(4) of the radiation sensor;

measuring the output value $R(T_U')$ of the ambient temperature sensor at said second ambient temperature $T_U'$; and calibrating the ambient temperature sensor by using $T_S(1)$, $T_S(2)$, $T_S(3)$, $T_S(4)$ and the values obtained for U(1), U(2), U(3) and U(4) and without using any values for $T_U$ and $T_U'$ that are derived from measuring an output of the ambient temperature sensor, and wherein the step of calibrating involves calculating the first and second ambient temperatures $T_U$, $T_U'$ and calculating the reference output value $R_0$ and the linear temperature coefficient of the ambient temperature sensor by using the calculated first and second ambient temperatures $T_U$, $T_U'$.

11. The method of claim 10, wherein the radiation sensor is characterized by a sensitivity (S), and wherein the step of calibrating involves calculating the sensitivity (S) of the radiation sensor by using either $T_S(1)$, $T_S(2)$ and the values obtained for U(1) and U(2) or $T_S(3)$, $T_S(4)$ and the values obtained for U(3) and U(4).

12. The method of claim 10 or 11 further comprising using the first radiation standard as the third radiation standard so that $T_S(3)=T_S(1)$ and using the second radiation standard as the fourth radiation standard so that $T_S(4)=T_S(2)$.

13. A method of calibrating a radiation thermometer including a radiation sensor and an ambient temperature sensor, wherein the ambient temperature sensor outputs at a specified reference temperature a reference output value $R_0$ and has a temperature dependence that is characterized by a linear temperature coefficient and a quadratic temperature coefficient, said method comprising:

using a first radiation standard having a known temperature $T_S(1)$; while the ambient temperature sensor is at a first ambient temperature $T_U$, using the radiation thermometer to read the temperature of the first radiation standard;

while using the radiation thermometer to read the temperature of the first radiation standard, measuring a first output signal U(1) of the radiation sensor;

using a second radiation standard having a known temperature $T_S(2)$;

while the ambient temperature sensor is at said first ambient temperature $T_U$, using the radiation thermometer to read the temperature of the second radiation standard; while using the radiation thermometer to read the temperature of the second radiation standard, measuring a second output signal U(2) of the radiation sensor;

measuring the output value $R(T_U)$ of the ambient temperature sensor at said first ambient temperature $T_U$;

using a third radiation standard having a known temperature $T_S(3)$;

while the ambient temperature sensor is at a second ambient temperature $T_U'$, using the radiation thermometer to read the temperature of the third radiation standard;

while using the radiation thermometer to read the temperature of the third radiation standard, measuring a third output signal U(3) of the radiation sensor;

using a fourth radiation standard having a known temperature $T_S(4)$;

while the ambient temperature sensor is at said second ambient temperature $T_U'$, using the radiation thermometer to read the temperature of the fourth radiation standard;

while using the radiation thermometer to read the temperature of the fourth radiation standard, measuring a fourth output signal U(4) of the radiation sensor;

measuring the output value $R(T_U')$ of the ambient temperature sensor at said second ambient temperature $T_U'$;

using a fifth radiation standard having a known temperature $T_S(5)$;

while the ambient temperature sensor is at a third ambient temperature $T_U''$, using the radiation thermometer to read the temperature of the fifth radiation standard;

while using the radiation thermometer to read the temperature of the fifth radiation standard, measuring a fifth output signal U(5) of the radiation sensor;

using a sixth radiation standard having a known temperature $T_S(6)$;

while the ambient temperature sensor is at said third ambient temperature $T_U''$, using the radiation thermometer to read the temperature of the sixth radiation standard;

while using the radiation thermometer to read the temperature of the sixth radiation standard, measuring a sixth output signal U(6) of the radiation sensor;

measuring the output value $R(T_U'')$ of the ambient temperature sensor at said third ambient temperature $T_U''$; and calibrating the ambient temperature sensor by using $T_S(1)$, $T_S(2)$, $T_S(3)$, $T_S(4)$, $T_S(5)$, $T_S(6)$ and the values obtained for U(1), U(2), U(3), U(4), U(5) and U(6) and without using any values for $T_U$, $T_U'$ and $T_U''$ that are derived from measuring an output of the ambient temperature sensor and wherein the step of calibrating involves calculating the first, second and third ambient temperatures $T_U$, $T_U'$, $T_U''$ and calculating the reference output value $R_0$ and the linear temperature coefficient and the quadratic temperature coefficient of the ambient temperature sensor by using the calculated first, second and third ambient temperatures $T_U$, $T_U'$, $T_U''$.

14. The method of claim 13, wherein the radiation sensor is characterized by a sensitivity (S), and wherein the step of calibrating involves calculating the sensitivity (S) of the radiation sensor by using either $T_S(1)$, $T_S(2)$ and the values obtained for U(1) and U(2) or $T_S(3)$, $T_S(4)$ and the values obtained for U(3) and U(4) or $T_S(5)$, $T_S(6)$ and the values obtained for U(5) and U(6).

15. The method of claim 13 or 14 further comprising using the first radiation standard as the third radiation standard so that $T_S(3)=T_S(1)$ and using the second radiation standard as the fourth radiation standard so that $T_S(4)=T_S(2)$.

16. The method of claim 13 or 14 further comprising using the first radiation standard as the fifth radiation standard so that $T_S(5)=T_S(1)$ and using the second radiation standard as the sixth radiation standard so that $T_S(6)=T_S(2)$.

* * * * *